United States Patent [19]

Staral et al.

[11] Patent Number: 5,693,446
[45] Date of Patent: Dec. 2, 1997

[54] POLARIZING MASS TRANSFER DONOR ELEMENT AND METHOD OF TRANSFERRING A POLARIZING MASS TRANSFER LAYER

[75] Inventors: John S. Staral; William A. Tolbert; Hsin Hsin Chou; Wu Shyong Li, all of Woodbury, Minn.

[73] Assignee: Minnesota Mining and Manufacturing Company, St. Paul, Minn.

[21] Appl. No.: 633,601

[22] Filed: Apr. 17, 1996

[51] Int. Cl.⁶ .................. G03C 8/02; G03F 7/34
[52] U.S. Cl. .................. 430/201; 430/200; 430/964; 503/227
[58] Field of Search .................. 430/209, 201, 430/964; 503/227

[56] References Cited

U.S. PATENT DOCUMENTS

| | | | |
|---|---|---|---|
| 2,524,286 | 10/1950 | Dreyer | 88/65 |
| 2,544,659 | 3/1951 | Dreyer | 88/65 |
| 3,520,752 | 7/1970 | Dreyer | 156/234 |
| 3,658,616 | 4/1972 | Dreyer | 156/234 |
| 4,245,003 | 1/1981 | Oransky et al. | 428/323 |
| 4,472,479 | 9/1984 | Hayes et al. | 428/324 |
| 4,588,674 | 5/1986 | Stewert et al. | 430/273 |
| 4,702,958 | 10/1987 | Itoh et al. | 428/323 |
| 4,711,834 | 12/1987 | Butters et al. | 430/201 |
| 4,738,949 | 4/1988 | Sethi et al. | 533/227 |
| 5,141,915 | 8/1992 | Roenigk et al. | 503/227 |
| 5,171,650 | 12/1992 | Ellis et al. | 430/20 |
| 5,311,033 | 5/1994 | Disanayaka | 250/591 |
| 5,459,016 | 10/1995 | Debe et al. | 430/201 |
| 5,506,189 | 4/1996 | Chou et al. | 503/227 |

FOREIGN PATENT DOCUMENTS

| | | |
|---|---|---|
| 0 624 421 | 11/1994 | European Pat. Off. . |
| 57-168204 | 10/1982 | Japan . |
| 1 212 866 | 11/1970 | United Kingdom . |
| WO 94/28073 | 12/1994 | WIPO . |

*Primary Examiner*—Richard L. Schilling
*Attorney, Agent, or Firm*—Gary L. Griswold; Walter N. Kirn; Daniel C. Schulte

[57] ABSTRACT

A method of transferring a high resolution polarizing image from a mass transfer donor element to a receptor element. The transfer can be induced by thermal energy or electromagnetic (optical) energy. In either case, the transferred image will be a high resolution image that exhibits optically anisotropic properties. The polarizing mass transfer donor element comprises a substrate having a polarizing mass transfer layer coated thereon. Optionally, the polarizing mass transfer donor element further comprises a light absorbing material, preferably in the form of a light to heat conversion layer. The polarizing mass transfer donor element can further comprise an adhesive to facilitate transfer of the polarizing mass transfer layer.

29 Claims, 8 Drawing Sheets

POLARIZING MASS TRANSFER DONOR ELEMENT AND METHOD OF TRANSFERRING A POLARIZING MASS TRANSFER LAYER

FIELD OF THE INVENTION

The present invention relates to a method of transferring a polarizing mass transfer layer, or a portion thereof, from a mass transfer donor element to a receptor element, wherein the transferred layer retains its polarizing properties and the polarizing layer is transferred in a high resolution, image-wise fashion. The present invention also relates to mass transfer donor elements used in the above method.

BACKGROUND

Mass transfer technologies involve the transfer of a mass transfer layer from a donor element to a receptor element. The mass transfer layer typically comprises a pigment, a dye, or another material that can be transferred to produce a useful image. It is also possible to transfer a mass transfer layers that contain oriented polarizer molecules which act to polarize light by selectively absorbing light depending on its orientation. Importantly, to provide a transferred layer having optically anisotropic properties, the polarizer molecules must maintain their orientation through the transfer process.

Past mass transfer methods have been capable of transferring polarizing mass transfer layers from a mass transfer donor element to a receptor element. These past methods, however, were generally lamination-type transfer methods and were not useful for high resolution imaging applications (i.e., transferring a high-resolution polarizing image). This is because past methods were limited in the speed with which transfer occurs, the resolution that could be obtained in a transferred image, the equipment available to transfer the image, and in their complexity and expense.

Generally, to transfer a mass transfer layer from a donor element to a receptor element, energy is supplied to the mass transfer donor element, while the donor element is in contact with a receptor element. The energy supplied causes a transfer of the mass transfer layer from the donor element to a receptor element. The energy used to cause the mass transfer can be either thermal energy or electromagnetic (optical) energy. Thermal energy can be supplied, for example, by resistive heating mechanisms which are believed to effect a mass transfer by means of a differential adhesion mechanism. Optically-induced mass transfer can entail the same differential adhesion mechanisms associated with resistive heating methods, and can also include ablative mechanisms that are believed to involve the rapid and transient accumulation of pressure beneath and/or within the mass transfer layer.

The mechanisms involved with mass transfer techniques create uncertainty as to whether a polarizing mass transfer layer can be successfully transferred from a mass transfer donor element to a receptor element. For instance, with thermal mass transfer techniques, the heat applied to a polarizing mass transfer layer could potentially allow reorientation of the polarizer molecules, or break down the polarizer molecules' chemical structure, either of which could potentially destroy the optically anisotropic properties of the polarizing mass transfer layer. Likewise, for optical mass transfer techniques, the non-equilibrium expansion which occurs in ablative methods, along with the attendant dramatic pressure changes, might also be predicted to destroy the orientation of polarizer molecules within a polarizing mass transfer layer. Because a transferred polarizing mass transfer layer must contain properly oriented polarizer molecules to provide polarizing properties, it is uncertain whether either of these mass transfer methods would be useful to transfer a polarizing mass transfer layer to a receptor element. That is, it is uncertain whether the aligned polarizer molecules would maintain their orientation, and therefore maintain optically anisotropic properties upon being transferred. What is needed is a simple and inexpensive method of transferring a high-resolution pattern of a polarizing mass transfer layer while maintaining the orientation of the polarizer molecules within the mass transfer layer.

SUMMARY OF THE INVENTION

The present invention relates to a method of transferring a high resolution polarizing image from a mass transfer donor element to a receptor element. The transfer can be caused by resistive heating methods or by optical methods. In either case, the transferred image can be a high resolution image that exhibits optically anisotropic properties.

The present invention can be used to transfer a polarizing mass transfer layer to a receptor element in an inexpensive and efficient manner, while maintaining the polarizing properties of the polarizing mass transfer layer. The invention can be used in countless product applications, including laminated glasses, illuminants for the auto industry, or the manufacture of glass for constructions and architecture. The present invention could also be used in the production of liquid crystal displays having internal polarizers, in the production of anti-reflective screens for video displays and television screens, for security applications, anti-counterfeiting applications, or any other application that involves polarizing materials.

An aspect of the present invention relates to a method of transferring a polarizing mass transfer layer from a polarizing mass transfer donor element to a receptor element. The method comprises the steps of providing a polarizing mass transfer donor element comprising a substrate and a polarizing mass transfer layer. A receptor element is contacted with the polarizing mass transfer layer of the donor element. One or more of a portion of the polarizing mass transfer donor element, or a portion of the receptor element, is heated to transfer a high-resolution image of polarizing mass transfer layer from the polarizing mass transfer donor element to the receptor element. The transferred image is optically anisotropic.

Another aspect of the present invention relates to a polarizing mass transfer donor element comprising a polarizing mass transfer layer disposed on a substrate, and further comprising a light absorbing material. The light absorbing material can optionally be contained in a light to heat conversion layer disposed between the substrate and the polarizing mass transfer layer. The polarizing mass transfer donor element may optionally further comprise an adhesive layer that transfer of the polarizing mass transfer layer.

As used herein, "high resolution polarizing image" refers to a transferred image that has a resolution of at least 50 dots per inch (dpi).

"Imaging energy" refers to energy that can cause an image-wise transfer of a polarizing mass transfer layer from a polarizing mass transfer donor element to a receptor element.

"Imaging radiation" refers to imaging energy in the form of optical energy from an optical heat source.

"Imaging thermal energy" refers to imaging energy in the form of thermal energy, for example from a resistive heat source.

DETAILED DESCRIPTION

Figure 1:
FIG. 1 is a side view of a mass transfer donor element of the present invention, which includes a substrate and mass transfer layer.

In the practice of the present invention, a polarizing mass transfer donor layer is transferred from a polarizing mass transfer donor element to a receptor element. FIG. 1 illustrates an embodiment of the mass transfer donor element of the present invention. In the Figure, mass transfer donor element 2 comprises polarizing mass transfer layer 6 disposed on substrate 4. Polarizing mass transfer layer 6 includes a polarizer which, when properly oriented, causes the mass transfer layer to exhibit optically anisotropic properties.

A mass transfer layer is considered to exhibit optically anisotropic properties, and therefore is considered to be "polarizing," if the mass transfer layer selectively absorbs light depending on the orientation of the light. (See, e.g., F. A. Jenkins and H. E. White, "Fundamentals of Optics," at 504 (1976)). The polarizing mass transfer layer of the present invention comprises a polarizer that exhibits optically anisotropic properties due to a non-random orientation of polarizer molecules contained therein. Polarizer molecules absorb photons of light according to the shape and chemical structure of the molecule. When polarizer molecules are randomly orientated within a mass transfer layer, the molecules will absorb light of all orientations equally, and the mass transfer layer will not display optically anisotropic properties. If, however, the polarizer molecules are in a non-random orientation (i.e., are to some degree aligned with one another), the polarizer molecules will absorb relatively more light of one plane of orientation, while absorbing relatively less light in a perpendicular plane of orientation. Light will be absorbed by the polarizer molecules within the polarizing mass transfer layer depending on the direction of orientation of the light. Where this occurs, the mass transfer layer is said to exhibit optically anisotropic properties, and the mass transfer layer is considered to be a polarizing mass transfer layer. It follows that polarizer molecules are considered to be "aligned" in a mass transfer layer when the polarizer molecules collectively absorb a greater amount of light oriented in one direction, than in another direction.

The optically anisotropic property of a polarizing mass transfer layer can be quantified in terms of a "dichroic ratio," defined herein as the ratio of the negative log of transmittance which the polarizer exhibits when inserted into a linearly polarized beam and turned to the azimuth that minimizes the intensity of the emerging beam, to the negative log of transmittance found when the polarizer is mined so as to maximize the intensity of the emerging beam. See e.g., W. A. Shurcliff and S. S. Ballard, Polarized Light, page 69 (1964). Optically anisotropic materials include any materials that exhibit a dichroic ratio that is greater than about 1.05. Preferred polarizing mass transfer layers will exhibit a dichroic ratio greater than about 1.1 for example greater than 1.5, and can often be up to or greater than 5 or 10.

The polarizer in the polarizing mass transfer layer can be any material having molecules that are capable of selectively absorbing electromagnetic radiation depending on the orientation of the radiation. Examples of preferred polarizers include dichroic light polarizers, and polarizing infrared, ultraviolet, and visible spectrum dyes. Preferred examples of dichroic light-polarizing molecules are described, for example, in U.S. Pat. No. 2,544,659 (Dreyer). Additional examples of preferred polarizers include the dichroic polarizers described in International Patent Application No. PCT/US94/05493, International Publication No. WO 94/28073. These include water soluble organic dyestuffs having the formula {Chromagen}$(SO_3M)_n$, wherein the chromagen is such that the dyestuff is capable of existing in a liquid crystalline phase, and M is a monovalent cation. Examples of these preferred dichroic polarizers include water soluble organic dyes such as sulphonic acids of azo- or polycyclic compounds, or their salts, such as those represented by the following formulas. Formula I:

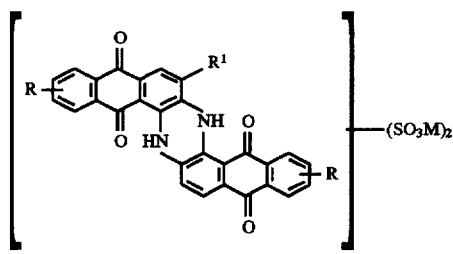

where:

each R can be independently chosen from: H, Alk, ArNH, or ArCONH;

$R^1$=H, Cl;

Alk is an alkyl group;

Ar is a substituted or unsubstituted aryl radical;

M is a monovalent cation such as $H^+$, a metal of the first group of the Periodic Table, or $NH_4^+$.

Formula II:

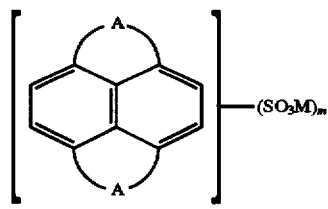

wherein

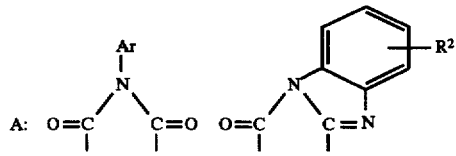

$R^2$ is H, an alkyl group, a halogen, or an alkoxy group; m=2–3;

Ar and M are as in formula I above.

Formula III:

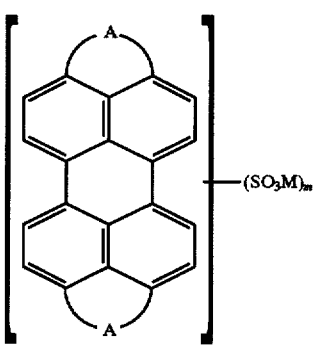

where A, M, m are as in formula II above.

Formula IV:

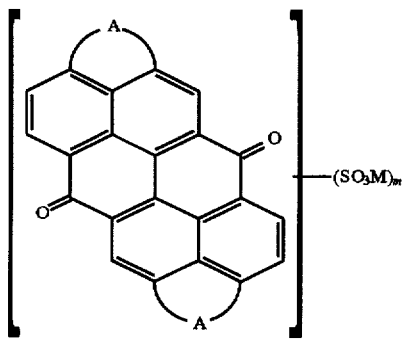

where A, M, m are as in formula II above.

Formula V:

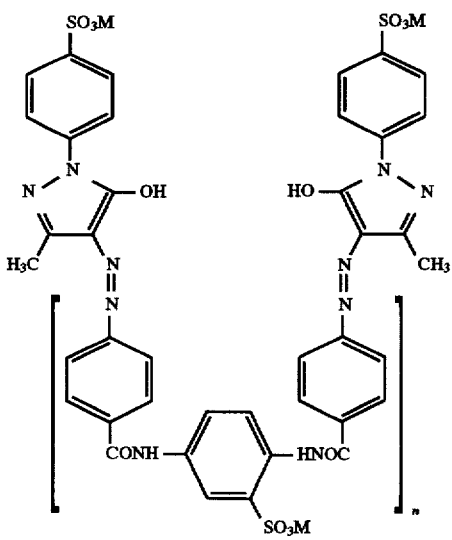

where M is as in formula I above and n=3–5.

Formula VI:

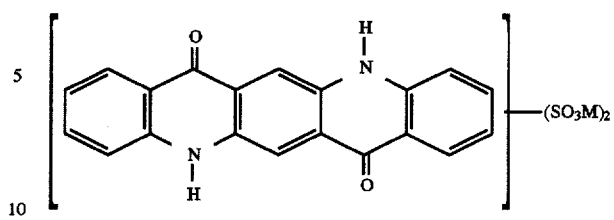

where M is as in formula I above.

Formula VII:

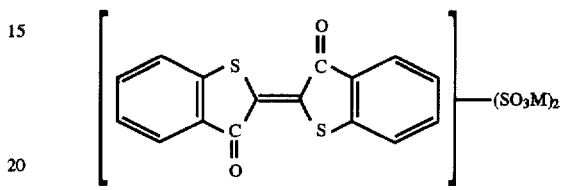

where M is as in formula I above.

In some embodiments of the compounds of formula I, one or more of relations (1), (2) and (3) hold true, wherein:

(1): Alk is an alkyl group with one to four carbon atoms, preferably with 1 to 2 carbon atoms ($CH_3$, $C_2H_5$).

(2): Ar is a substituted or unsubstituted phenyl radical; a suitable substituent for the phenyl radical is Cl. Thus in some embodiments, Ar is $C_6H_5$ or $4-ClC_6H_4$.

(3): M=$H^+$, $Li^+$, $Na^+$, $K^+$, $Cs^+$, or $NH_4^+$.

In some embodiments of the compounds of formulas II–VII, one or more of relations (3), (4) and (5) hold true, wherein:

(4): R=H; or an alkyl group with 1 to 4 carbon atoms, and preferably with 1 to 2 carbon atoms ($CH_3$, $C_2H_5$); or an alkoxy group with 1 to 2 carbon atoms (preferably methoxy $CH_3O$); or Br; or Cl.

(5): Ar is a substituted or unsubstituted phenyl radical. Thus, in some embodiments, Ar is $C_6H_5$, $4-CH_3OC_6H_4$ ($CH_3O$ is a substituent), $4-C_2H_5OC_6H_4$, $4-ClC_6H_4$, $4-C_4H_9C_6H_4$, or $3-CH_3C_6H_4$.

The polarizers of formulas I–VII can be produced by precipitation methods known in the polarizer art, and described in International Patent Application Number PCT/US94/05493 (International Publication Number WO 94/28073). For example, dyes having formula I can be produced by first dissolving 50 grams (g) of indanthrone in 200 milliliters (ml) of chlorosulfonic acid, followed by stirring the solution for 11–12 hours at 80°–90° C. After cooling the solution to room temperature the mixture is diluted with 200 ml of water, and the precipitate is filtered off with suction. The dyestuff is suspended in 300 ml of concentrated hydrochloric acid, heated at 90° C. for 1 hour, filtered off with suction, washed with concentrated hydrochloric acid, and dried, to produce the dye of formula I, wherein R=H and $R^1$=Cl.

Optionally, the polarizing mass transfer layer can also contain a binder. The binder can be any binder known to be useful with mass transfer layers. The binder may act to disperse the polarizer molecules during application onto the substrate, and to thereafter adhere the polarizer molecules to the substrate. Further, the binder may optionally be of a nature that will decompose upon exposure to sufficient energy, facilitating ablative transfer of the polarizing mass transfer layer from the donor element to a receptor element. Preferred binders include conventional film-forming polymers that are transparent in the visible spectrum. Examples include thermoplastic or thermosetting materials such as polycarbonates, polysulfones, styrene/acrylonitrile polymers, polystyrenes, cellulose ethers and esters, polyacetals, acrylate and methacrylate polymers and copolymers, polyvinylidene chloride, α-chloroacrylonitrile, maleic acid resins and copolymers, poly(vinyl alcohol), polyamines, poly(ethylene glycol), poly(propylene glycol), etc. In one embodiment, the polarizing thermal mass transfer layer contains a thermosettable binder. After the polarizing mass transfer layer is transferred to the receptor element, the thermosettable binder can be crosslinked, for instance by exposing the thermosettable binder to heat, a suitable radiation source, or a chemical curative, as is appropriate for the particular thermosettable binder.

The amount of binder can be any amount that is useful in adhering a polarizer material to a mass transfer donor element, while still being able to orient the polarizer molecules to produce a polarizing mass transfer layer. Preferred amounts of binder can be in the range up to about 50 parts by weight binder per 100 parts polarizing material, with the range of up to about 20 parts by weight binder per 100 parts by weight polarizer being preferred.

The polarizing mass transfer donor element can contain other ingredients known to be useful with mass transfer donor elements. For instance, a polarizing mass transfer donor element can optionally contain a light absorbing material that absorbs imaging radiation and converts that energy into heat energy. The light absorbing material can be any material that will absorb a portion of incident imaging radiation, converting the radiation energy to heat energy, and thereby facilitating transfer of the polarizing mass transfer layer from the donor element to a receptor element. Examples of materials that can be useful as light absorbing materials include suitably absorbing dyes (i.e., those that absorb light in the ultraviolet, infrared, etc. wavelengths), binders or other polymeric materials, organic or inorganic pigments that can be a black-body or a non-black-body absorber, metals or metal films, or other suitable absorbing materials.

Examples of dyes that have been found to be useful light absorbing materials include dyes absorbing of light in the infrared region of the spectrum. These are described, for example in Matsuoka, M., *Infrared Absorbing Materials*, Plenum Press, New York, 1990, in Matsuoka, M., *Absorption Spectra of Dyes for Diode Lasers*, Bunshin Publishing Co., Tokyo, 1990, in U.S. Pat. Nos. 4,772,583, 4,833,124, 4,912,083, 4,942,141, 4,948,776, 4,948,777, 4,948,778, 4,950,639, 4,940,640, 4,952,552, 5,023,229, 5,024,990, 5,286,604, 5,340,699, 5,401,607 and in European Patent Nos. 321,923 and 568,993. Additional dyes are described in Bello, K. A. et al., *J. Chem. Soc., Chem. Commun.*, 452 (1993) and U.S. Pat. No. 5,360,694. IR absorbers marketed by American Cyanamid or Glendale Protective Technologies under the designation IR-99, IR-126 and IR-165 may also be used, as disclosed in U.S. Pat. No. 5,156,938. In addition to conventional dyes, U.S. Pat. No. 5,351,617 describes the use of IR-absorbing conductive polymers as light absorbing materials.

Other examples of preferred light absorbing materials include organic and inorganic absorbing materials such as carbon black, metals, metal oxides, or metal sulfides. Representative metals include those metallic elements of Groups Ib IIb, IIIa, IVa, IVb, Va, Vb, VIa, VIb and VIII of the Periodic Table, as well as alloys thereof, or alloys thereof with elements of Groups Ia, IIa, and IIIb, or mixtures thereof. Particularly preferred metals include Al, Bi, Sn, In or Zn, and alloys thereof or alloys thereof with elements of Groups Ia, IIa and IIIb of the Periodic Table, or compounds or mixtures thereof. Suitable compounds of these metals include metal oxides and sulfides of Al, Bi, Sn, In, Zn, Ti, Cr, Mo, W, Co, Ir, Ni, Pd, Pt, Cu, Ag, Au, Zr and Te, and mixtures thereof.

The light absorbing material can be added to one or more of the components of the polarizing mass transfer donor element (e.g., the substrate, mass transfer layer, adhesive layer, etc.). For instance, FIG. 1 shows an embodiment of a polarizing mass transfer donor element of the present invention. In the Figure, polarizing mass transfer layer 6 of polarizing mass transfer donor element 2 contains a polarizer, and can optionally contain a separate light absorbing material.

Figure 2:
FIG. 2 is a side view of a mass transfer donor element of the present invention which includes a substrate, a mass transfer layer, and a light to heat conversion layer disposed between the substrate and the mass transfer layer.

In one embodiment of the present invention, as is illustrated by FIG. 2, the light absorbing material can be present in the polarizing mass transfer donor element as a separate layer, referred to herein as a "light to heat conversion layer." Referring to FIG. 2, polarizing mass transfer donor element 8 comprises light to heat conversion layer 12 disposed between substrate 4, and polarizing mass transfer layer 6. Light to heat conversion layer 12 can preferably include one or more layers of organic or inorganic materials that absorb imaging radiation. These light to heat conversion layers can be comprised of 100% light absorbing material; for example if the light to heat conversion layer is in the form of a metallic film. Metallic-type light to heat conversion layers can preferably have a thickness in the range from about 0.001 to 10 μm, more preferably in the range from about 0.002 to 1.0 μm.

Alternatively, a light to heat conversion layer can comprise particles of light absorbing material (e.g., carbon black) dispersed in a binder. The binder can be any of a number of known film-forming polymers such as thermoset, thermosettable, or thermoplastic polymers, including phenolic resins (e.g., novolak and resole resins), polyvinylacetates, polyvinylidene chlorides, polyacrylates, cellulose ethers and esters, nitrocelluloses, polycarbonates, and mixtures thereof. Preferably, this type of light to heat conversion layer is coated to a dried thickness of from 0.05 to 5.0 micrometers (μm), more preferably from 0.1 to 2.0 μm.

As an alternative to a light absorbing material in the polarizing mass transfer donor element, a light absorbing material may be present in a component of the receptor element, for example within the substrate of the receptor element, within an adhesive layer of the receptor element, or within a separate layer of the receptor element. If the light absorbing material is present in the receptor element, or is a portion of the polarizing mass transfer donor element that transfers to the receptor element during imaging, it follows that the light absorbing material will be present in the imaged receptor element. In such as case, it is preferred that the light absorbing material not interfere with the performance properties (e.g., the desired optical properties) of the imaged receptor.

In another preferred embodiment of the present invention, the polarizing mass transfer donor element includes an adhesive layer disposed on the polarizing mass transfer layer. The surfaces of many receptor elements do not provide an optimum surface for adhering to a polarizing mass transfer layer. The different chemical nature of a receptor element and a polarizing mass transfer layer, the surface structure of the receptor element, or other factors, provide a sub-optimum surface for adhering to a polarizing mass transfer layer. In other cases, there can be contaminants present on a receptor surface. For instance, thermoplastic receptor elements can have silicone materials coated on their surfaces. These silicone materials can reduce the ability of a polarizing mass transfer layer to adhere to the receptor element.

Figure 3:
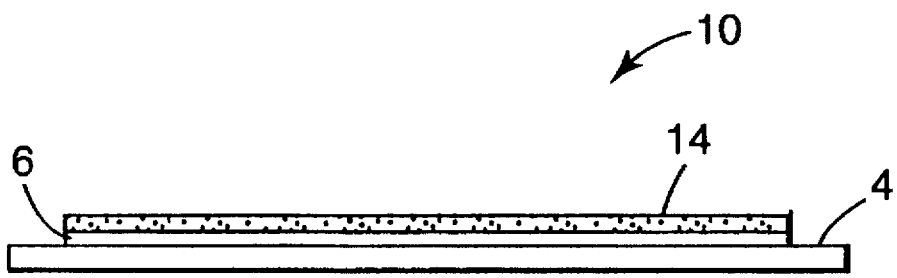
FIG. 3 is a side view of a mass transfer donor element of the present invention which includes a substrate, a mass transfer layer, and an adhesive layer.

An adhesive layer provided on a receptor element can provide an improved surface for adhering to a polarizing mass transfer layer. For instance, an adhesive layer can fill in any surface structure that might not allow complete contact between the receptor element and the polarizing mass transfer layer. Further, the chemical nature of the adhesive can be tailored to adhere to the particular polarizing mass transfer layer being transferred. Additionally, an adhesive layer can adhere to or cover up any contaminants present on the surface of the receptor element. Each of these functions provides for improved adhesion between the receptor element and the polarizing mass transfer layer. FIG. 3 illustrates an embodiment of the present invention that includes an adhesive layer. In the Figure, polarizing mass transfer element 10 comprises polarizing mass transfer layer 6 disposed on substrate 4. Adhesive layer 14 is disposed on top of polarizing mass transfer layer 6. Adhesive layer 14 acts to increase adhesion between the polarizing mass transfer layer and the receptor element at the imaging areas, thereby facilitating transfer of polarizing mass transfer layer 6 from polarizing mass transfer element 10 to a receptor element.

The adhesive material can comprise any mass transferable material that will adhere first to a receptor element, and that will also provide a surface that is receptive to a polarizing mass transfer layer. Examples of these types of adhesive materials are described, for example, in Applicant's copending U.S. patent application, U.S. Ser. No. 08/436,948 by Chou et al., and designated by Attorney's Docket No. 49298USA6B.

More specifically, the adhesive layer preferably comprises an adhesive material that includes at least one of a polymeric resin, and a wax or a wax-like material. Suitable polymeric resins have melting or softening points in the range of about 20° to 180° C., preferably in the range of 40° to 140° C., more preferably in the range of 55° to 120° C., and most preferably in the range of 60° to 100° C. and include polycaprolactone, polyethylene glycols, aromatic sulfonamide resins, acrylic resins, polyamide resins, polyvinyl chloride and chlorinated polyvinyl chloride resins, vinyl chloride-vinyl acetate copolymers, alkyd resins, urea resins, melamine resins, polyolefins, benzoguanamine resins and copolycondensates or copolymers of the above resin materials. Preferred polymeric resins are polycaprolactones having an average molecular weight of 10,000 g/mol (mp 60°–65° C.), polyethylene glycols having an average molecular weight of 6000 g/mol (mp ~62° C.), low condensation polymerized melamine toluene-sulfonamide resins (sp ~105° C.), low condensation polymerized benzyltoluene sulfonamide resins (sp ~68° C.), acrylic resins (sp ~85° C.), and linear polyamide resins (sp ~60° C.). The terms "mp" and "sp" refer to "melting point" and "softening point," respectively.

The wax, or wax-like material facilitates conformance of the adhesive material to a rough receptor element surface, such as paper. Suitable wax-like materials have a melting point or softening point in the range from about 35° to 140° C., and include higher fatty acid ethanolmines such as stearic acid monoethanolamide, lauric acid monoethanolamide, coconut oil monoethanolamide; higher fatty acid esters such as sorbitan behenic acid ester; glycerine higher fatty acid esters such as glycerine monostearic acid ester; acylated sorbitols such as acetylsorbitol and benzoylsorbitol, acylated mannitols such as acetylmannitol; and waxes such as beeswax, paraffin wax, carnauba wax, crystalline waxes, synthetic candelilla waxes, CHLOREZ waxes, etc., and mixtures thereof. Preferred wax-like materials include stearic acid monoethanolamide (mp 91°–95° C.), lauric acid monoethanolamide (mp 80°–84° C.), coconut oil fatty acid monoethanolamide (mp 67°–71° C.), sorbitan behenic acid ester (mp 68.5° C.), sorbitan stearic acid ester (mp 51° C.), glycerine monostearic acid ester (mp 63°–68° C.), acetyl sorbitol (mp 99.5° C.), benzoyl sorbitol (mp 129° C.), and acetyl mannitol (mp 119°–120° C.).

The adhesive material preferably further comprises a solid particulate that has a diameter in the range from about 0.01 to 5 micrometer solid particulate. The solid particulate can provide the benefit of reducing or eliminating adhesion of the donor element to the receptor element during the mass transfer process. Preferred solid particulates include clear, fine solid particles that are insoluble, yet easily dispersible in an adhesive dispersion. Preferred particulates include $SiO_2$, micas, polyethylene powders, $TiO_2$, MgO, ZnO, $CaCO_3$, etc. The adhesive layer can also include other ingredients known to be useful in adhesive layers, for example any of the light absorbing materials described above.

The adhesive material can contain any amount of the above ingredients that will provide a useful adhesive layer. The adhesive material can comprise, for example, from about 0 to 30% by weight particulates and 70 to 100% by weight binder (wax material and polymer). The binder usually comprises 0 to 70% wax and 30–100% by weight polymers. Overall the adhesive material may comprise 0 to 30% particulates, 0 to 70% wax and, 30 to 100% polymer.

Preferably, the adhesive material has a melting point (mp) or softening point (sp) of 50°–140° C., more preferably from 60° to 100° C. The adhesive material is preferably optically clear, so that it is not visible upon being transferred to the receptor element. Most preferably, an adhesive layer having a thickness of 10 micrometers will have an optical density of less than 0.2, preferably less than 0.1, and most preferably less than 0.05. "Optical density" refers to the absorbance of a material as defined by the formula:

$$\text{absorbance} = -\log [I/Io]$$

wherein I is intensity of transmittance and Io is the intensity of incident light.

The polarizing mass transfer donor element can also include a low-friction anti-stick coatings, such as those described in U.S. Pat. No. 5,141,915 to Roenigk et al. For example, in FIG. 2, substrate 4 can optionally have a low friction anti-stick coating disposed on the surface opposite the surface coated with polarizing mass transfer layer 6.

In the practice of the present invention, the receptor element can be any material capable of receiving a mass transfer layer from a mass transfer donor element. The receptor element preferably comprises a substrate such as a film or sheet-like material made of glass, plastic, metals, papers, etc., and can be transparent, opaque, reflective, translucent, or light impermeable. Preferred plastic receptor elements include transparent sheet-like materials made of plastics, including acrylics, vinyls, polyolefins, polyesters such as polyethylene terephthalate (PET), polyethylene naphthalate (PEN), polysulfones, polystyrenes, polycarbonates, polyimides, polyamides, cellulose esters such as cellulose acetate and cellulose butyrate, polyvinyl chlorides and derivatives thereof, and copolymers comprising one or more of the above materials.

The receptor element can also include other materials known in the art to be useful with receptor elements. For example, the receptor element can include an adhesive layer, as described above with respect to the polarizing mass transfer donor element. Further, the receptor element may include any of the light absorbing materials described above, either in the substrate, as a separate light to heat conversion layer, or within an adhesive layer, etc. Also, the receptor element may contain other optically-active components.

To transfer the polarizing mass transfer layer from the donor element to the receptor element, the receptor element is placed in contact with the polarizing mass transfer layer of the donor element. The receptor element is considered to be "in contact with the donor element" when the receptor element is in sufficiently close proximity to the donor element to allow effective transfer of the polarizing mass transfer layer from the donor element to the receptor element.

In the method of the present invention, one or more of the mass transfer donor element or the receptor element (or a portion of either, e.g., substrate, mass transfer layer, light to heat conversion layer, etc.) is heated with imaging energy while the polarizing mass transfer layer is in contact the receptor element. The imaging energy causes an image-wise transfer of the polarizing mass transfer layer from the polarizing mass transfer donor element to the receptor element. The imaging energy can be either thermal energy (imaging thermal energy) or optical energy (imaging radiation).

The imaging thermal energy can be applied to the donor element, the receptor element, or both, by any means that will effectively transfer the polarizing mass transfer layer from the donor element to the receptor element. Also, the temperature to which the polarizing mass transfer material is heated can be any temperature that will cause a transfer. This temperature will depend on several factors including the adhesive nature of the donor element, the receptor element, and the polarizing mass transfer layer.

Imaging thermal energy can be supplied by resistive heating apparatuses. Examples of suitable resistive heating apparatuses include thermal print heads conventionally used in thermal transfer printers. A suitable example of a thermal print head is a Kyocera KMT-256-12MPE4 transfer printer head, available from Kyocera Northwest Inc., of Minneapolis, Minn. These thermal print heads typically operate at temperatures that produce a donor-receptor interfacial temperature in the range from about 50°–250° C. The described thermal mass transfer methods can be used in the practice of the present invention to transfer images of the polarizing mass transfer layer having a resolution of at least 50 dots per inch, for example 200 or 300 dots per inch, preferably 400 dots per inch, and more preferably 600 dots per inch.

In optical transfer techniques, the imaging radiation can be any type of electromagnetic radiation that can cause a transfer of the polarizing mass transfer layer from a mass transfer donor element to a receptor element. The source of the imaging radiation can be any of a variety of light-emitting apparatuses, including lasers and other high powered light sources (e.g., flash lamps such as xenon flash lamps). Typically, the imaging radiation is in the visible, infrared, or ultraviolet spectral region, for example at a wavelength in the range from 0.18 to 1.2 microns, and preferably at a wavelength from 0.532 to 1.064 microns. Also preferably, the source of imaging radiation is a laser, for example an infrared, ultraviolet, or visible laser. Preferred lasers include high power (100 mW) single mode laser diodes, fiber-coupled laser diodes, and diode-pumped solid state lasers (e.g., Nd:YAG and Nd:YLF). These lasers can provide temperatures in the range from 0°–1000° C., laser dwell times in the range from about 0.05 to 50 microseconds, and laser fluences in the range from about 0.01 to about 10 joule/cm$^2$, for example about 2 joule/cm$^2$. The described optical mass transfer methods can be used in the practice of the present invention to transfer high resolution polarizing images having a resolution of at least 50 dots per inch, for example 200 or 300 dots per inch, preferably 500 dots per inch, and more preferably 1000 dots per inch.

The polarizing mass transfer donor element of the present invention can be prepared by disposing the above-described layers of a polarizing mass transfer donor element (i.e., a polarizing mass transfer layer, and optionally one or more of a light to heat conversion layer, or an adhesive layer, etc.), onto a substrate. The substrate can be constructed of any material known to be useful as a substrate for a mass transfer donor element. The substrate is generally either a rigid sheet material such as glass, or a flexible film. The substrate can be smooth or rough, transparent, opaque, sheet-like or non-sheet-like. Examples of suitable film substrates include polyesters, especially polyethylene terephthalate (PET), polyethylene naphthalate (PEN), polysulfones, polystyrenes, polycarbonates, polyimides, polyamides, cellulose esters such as cellulose acetate and cellulose butyrate, polyvinyl chlorides and derivatives thereof, and copolymers comprising one or more of the above materials. The substrate generally has a thickness from 1 to 200 microns. For optical mass transfer methods that use a laser to cause a transfer of the polarizing mass transfer layer, the thickness of the substrate can be anywhere within this range. When a thermal print head is used, to cause transfer of the polarizing mass transfer layer, it is preferable to use a substrate having a thickness at the lower end of this range, e.g., from 1 to 50 microns, preferably from about 2 to 25 microns. A thinner substrate will reduce the amount of heat that dissipates laterally through the thickness of the substrate, thereby providing a transferred image having optimal clarity and resolution.

There are several known methods of providing a polarizing mass transfer layer onto a substrate. As defined above, a polarizing mass transfer layer comprises polarizer molecules that are oriented in a non-random fashion, or to some degree aligned, to provide optically anisotropic properties. To provide such a polarizing mass transfer layer, the polarizer molecules are typically first dissolved to provide a polarizer solution that can be coated onto a substrate and dried.

The polarizer solution can, as desired, include other ingredients known to be useful in the mass transfer art. These include, for example, any of the light absorbing materials and binders discussed above, dispersants, surfactants, photoinitiators, antioxidants, inhibitors, and other additives that serve specific functions.

A polarizer solution can be applied to a substrate by any of several known coating methods. These include knife coating, Meyer Bar coating methods, die coating methods, and dip coating methods, among others. The polarizer molecules can be aligned within a coated mass transfer layer by methods that are known in the art. For example, polarizer molecules can be aligned as the polarizer solution is being coated onto the substrate, for example by means of a shearing force applied to the polarizer solution during coating. By this technique, the relative motion between the coating mechanism and the substrate can be adjusted to cause a small shear force in the direction of desired alignment. Examples of these methods include knife coating methods and Meyer Bar coating methods, lithographic coating methods, and die coating methods.

Polarizer molecules within a mass transfer layer can also be aligned by stresses involved in the tension deformation of a meniscus of the polarizing solution that is formed between two surfaces having the polarizer solution coated there between. This method is described in International Patent Application PCT/US94/05943, (International Publication Number WO 94/28073). By this method, a layer of polarizer solution is coated on a substrate and a second film is placed on the coated layer of polarizer solution. The second film is peeled off, creating a meniscus of the polarizer solution between the two films. The forces acting to form the meniscus also act to orient the polarizer molecules within the mass transfer layer.

By another method of providing oriented polarizer molecules, a polarizer solution can be coated onto a substrate to which surface anisotropy has been imparted (an "oriented" surface), with the polarizer molecules being dispersed and randomly oriented in the polarizer solution. A substrate can acquire a surface anisotropy by means of mechanical rubbing of the surface, as described in U.S. Pat. Nos. 2,544,659, and U.K. Patent Specification 1212866. As the polarizer solution is permitted to dry upon the oriented surface, the polarizer molecules experience a nematic state during which the polarizer molecules become anisotropically aligned to the anisotropic surface of the treated substrate.

Polarizer molecules of a polarizing solution can also be aligned by using external fields such as magnetic or electrical fields.

Once the polarizer solution has been coated onto the substrate, with the polarizing molecules being aligned, the polarizing solution can be dried by methods known in the art. Upon drying, the polarizer molecules become substantially set in their aligned orientation.

If a light to heat conversion layer is present in either a donor element or a receptor element, the light to heat conversion layer can be deposited onto the substrate by known methods, including for example solution coating methods and vapor deposition methods, followed by drying if necessary. In a mass transfer donor element, a polarizing mass transfer layer can thereafter be deposited onto the light to heat conversion layer by any of the above-described methods. The above-described adhesive layers can also be coated onto either a polarizing mass transfer donor element, or a receptor element, by methods known in the art. Particular examples include knife coating methods, Meyer Bar coating methods, gravure coating methods, screen printing methods, flexo-printing methods, etc., following by drying, if necessary.

EXAMPLES

Example 1

Laser Induced Transfer of a Polarizing Mass Transfer Layer onto a Receptor Element Comprising a Laser Absorbing Layer Preparation of Receptor Element Comprising a Laser Absorbing Coating A solution of poly(methyl methacrylate) in 2-butanone was prepared by combining and agitating 15.02 grams of poly(methyl methacrylate) (from Polysciences, Inc., and specified to have molecular weight of 100,000 amu) and 485.13 grams of 2-butanone (EM Science GR grade). The resultant solution (19.80 grams) was combined with 0.31 grams of Cyabsorb IR-165 (Glendale Protective Technologies, Lakeland, Fla.) and an additional 9.90 grams of 2-butanone, to produce a homogeneous light to heat absorbing solution designated "LH-Solution 1." LH-Solution 1 was coated onto a sample of clear, unprimed 4 mil poly(ethylene terephthalate) using a #12 coating rod. After coating, the sample was dried at 60° C. for 15 minutes in a nitrogen atmosphere to produce a receptor element comprising a laser absorbing layer. The receptor element was designated RE-1.

The transmission and reflection spectra of the laser absorbing layer of RE-1 were measured from the laser absorbing layer side of RE-1 using a Shimadzu MPC-3100 spectrophotometer with an integrating sphere. The transmission optical density (TOD=–logT, where T is the measured fractional transmission) and reflection optical density (ROD=–logR, where R is the measured fractional reflectance) at 1060 nm are listed in Table 1. The thickness of the coating was determined by profilometry after masking and removing a portion of the coating with 2-butanone.

TABLE 1

| Data for Receptor Element 1 (RE-1) | | |
|---|---|---|
| TOD of Laser Absorbing Layer at 1064 nm from Coating Side | ROD of Laser Absorbing Coating at 1064 nm from Coating Side | Thickness of Laser Absorbing Layer (μm) |
| 0.914 | 1.138 | 0.52 |

Polarizing Mass Transfer Donor Element 1 (DE-1)

Polarizing Mass Transfer Donor Element 1, designated DE-1, comprised an 8 mil (about 200 micron) PET substrate coated with a 0.2 μm blue lightfast dichroic light polarizer such that the coating exhibited optically anisotropic properties. The coating contained no additional binder or light absorbing material, and the dye had the structure illustrated in formula VIII:

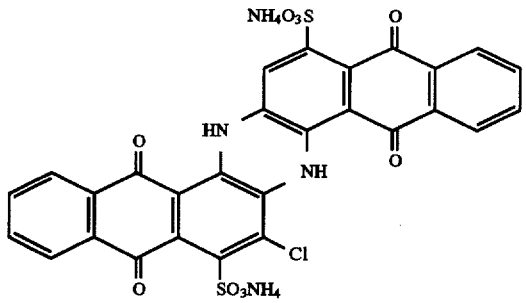

Laser Induced Transfer of the Dichroic Dye Coating from DE-1 to RE-1

For Examples 1–3, a dichroic dye layer was transferred from a donor element to a receptor element using the following laser imaging conditions. The dichroic dye (polarizing mass transfer layer) side of the Donor Element was held in intimate contact with the coated side of the Receptor Element, as the Receptor Element was held in a vacuum chuck. The laser was incident upon the substrate side of the DE-1, and normal to the donor/receptor surface. The vacuum chuck was attached to an X-Y translation stage such that it could be scanned in the plane of the donor/receptor surface, allowing laser exposure over the entire surface. A modified Quantronix 117 CW (continuous wave)

Nd:YAG laser system was used for exposure, providing up to 14.5 Watts at 1064 nm in the film plane. The laser had a Gaussian spatial profile with the spot size tailored using external optics. An acoustic-optic modulator allowed control of the laser power from ~0 to 80%, and of the laser pulse width from ~20 ns to CW. The X-Y stage, laser power, pulse width, and repetition rate were computer controlled, allowing programmed patterns to be imaged.

For Example 1, the dichroic dye coating of DE-1 was contacted to the laser absorbing layer of the RE-1, and the dichroic dye coating was transferred in an imagewise fashion from the DE-1 to RE-1. The laser power, pulse width, and spot size ($1/e^2$ diameter) employed were 2.5 watts, 100 μsec, and 100 μm respectively. The corresponding imaged receptor was designated IR-1.

Measurement of Dichroic Ratio of Transferred Coating on IR-1

The dichroic ratios of the original coating polarizer coating of DE-1, and the transferred coating of IR-1, were measured using visible light microspectrophotometry with a Leica MPV-SP UV/Visible microspectrophotometer mounted on a Leica Orthoplan microscope according to the following procedure. Two transmittance measurements for each sample were obtained by using linearly polarized light. The first measurement was made by orienting the polarizer to obtain the most saturated blue transmission color. In this configuration the sample has the greatest light absorption in the complementary color region. The polarizer was then rotated 90°. In this configuration, the sample has the maximum transmittance across the spectral range 400 to 800 nm. Reference spectra at both polarizer orientations were collected for the non-pleochroic substrate of each sample. These spectra were defined to be at 100% transmission for the wavelength region. The spectra collected for the absorbing regions were normalized to the reference spectra of the same substrate and polarizer orientation. Based upon these measurements the dichroic ratio was determined as a function of wavelength for each sample. The dichroic ratio as used here is defined as:

$$\text{Dichroic Ratio} = d_2/d_1$$

wherein $d_1 = -\log(k_1)$, wherein $k_1$ is the transmittance for a polarizer oriented for minimum blue saturation, and $d_2 = -\log(k_2)$, wherein $k_2$ is the transmittance for a polarizer oriented for maximum blue saturation.

Figure 4:
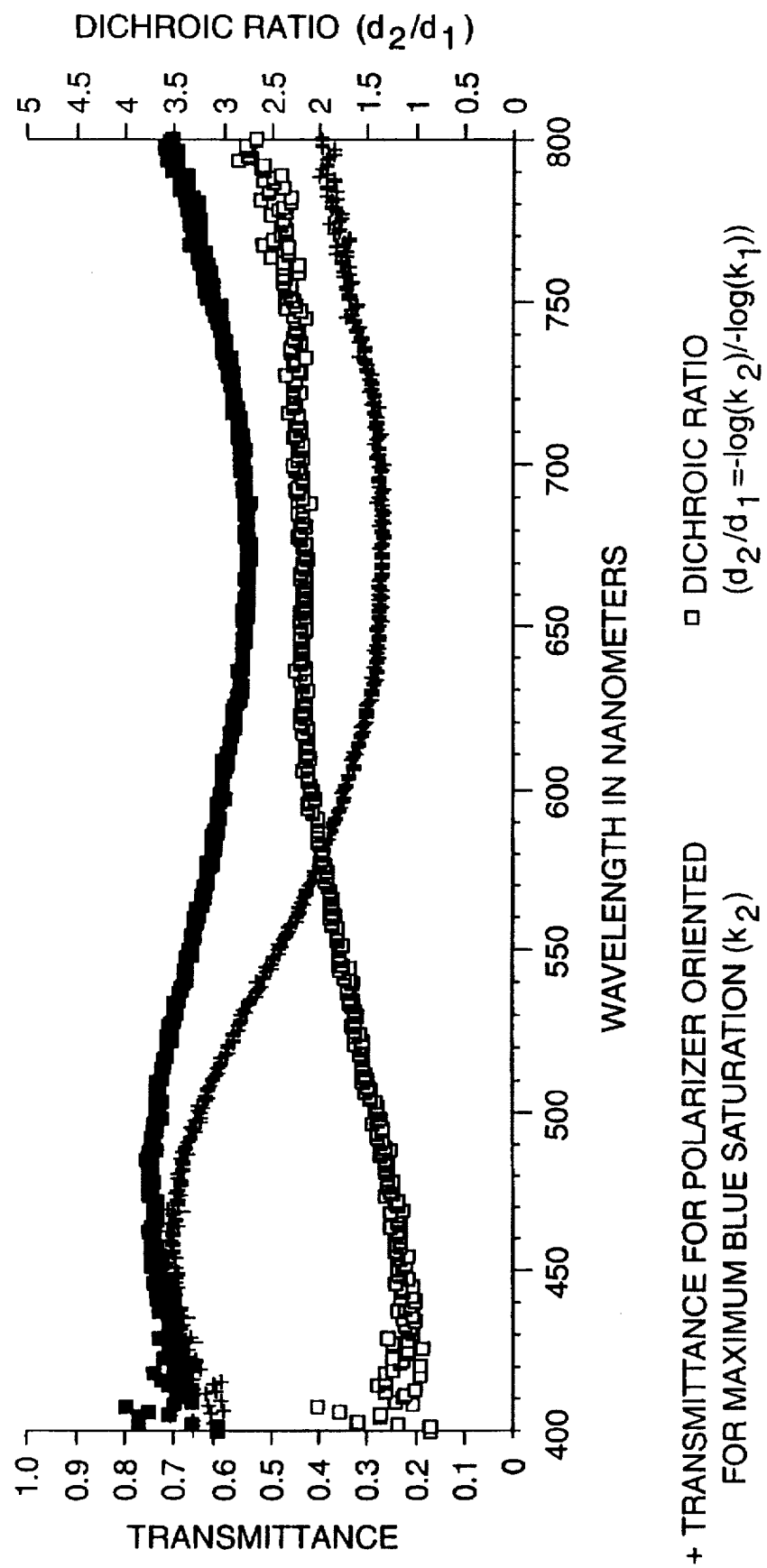
FIGS. 4 through 10 are graphs of the transmittance and dichroic ratio of polarizers of the present invention before and after transfer.
Figure 5:
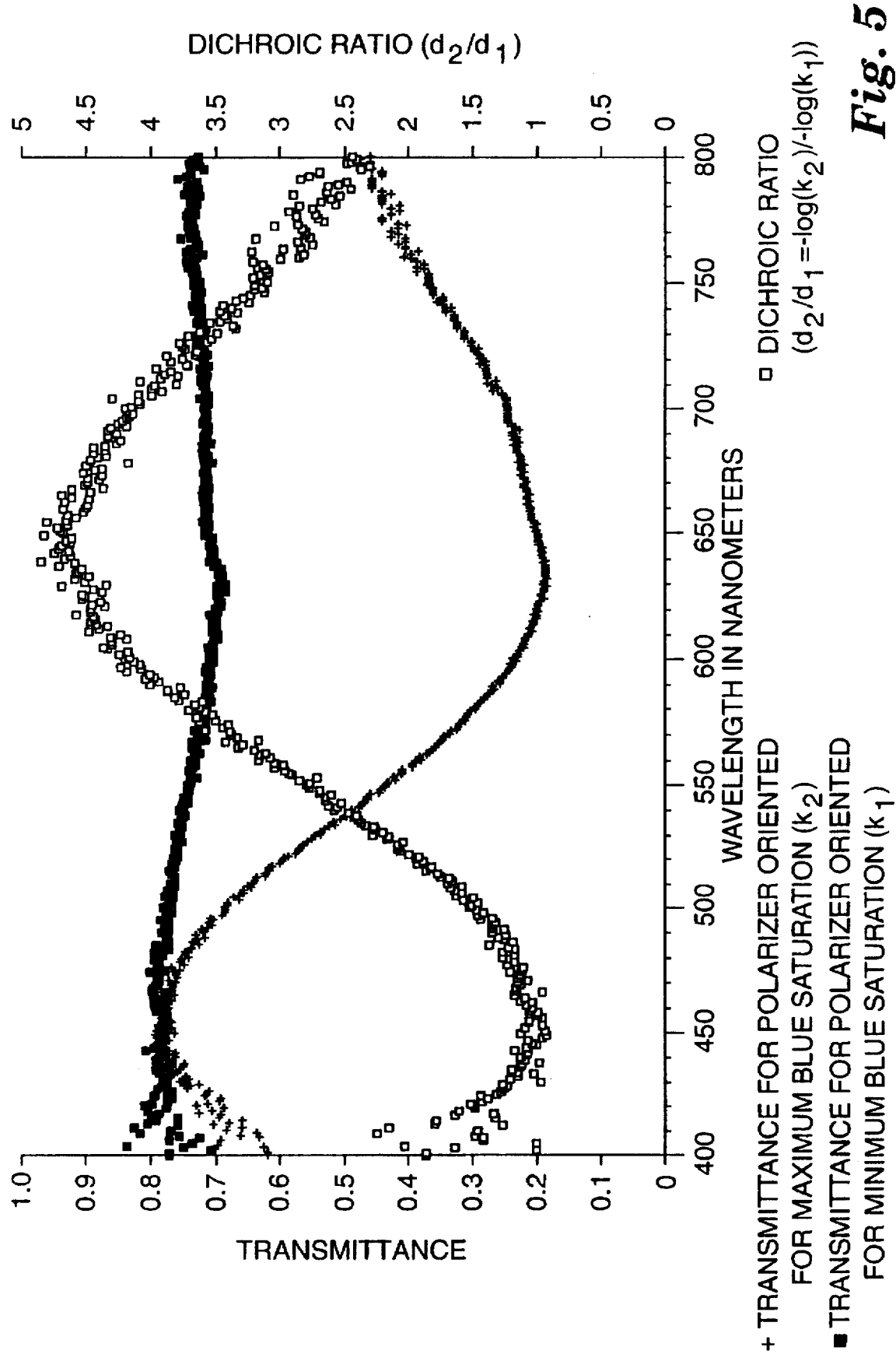

The corresponding data for the polarizer layer of DE-1, and the transferred coating of IR-1, are provided in FIGS. 4 and 5, respectively. Comparison of the corresponding dichroic ratios over the spectral range 400 to 800 nm demonstrates the successful imagewise transfer of the polarizing mass transfer layer from Donor Element 1 (DE-1), to Receptor Element 1 (RE-1) to produce Imaged Receptor 1 (IR-1), wherein the polarizing mass transfer layer maintained its desired optically anisotropic properties.

Example 2

Laser Induced Transfer of a Dichroic Polarizing Film Employing a Laser Absorbing Donor Preparation of Laser Absorbing Donor Element 2 (DE-2)

A black aluminum ($AlO_x$) coating was deposited onto a 4 mil poly(ethylene terephthalate) (PET) substrate via sputtering of Al in an $Ar/O_2$ atmosphere under the following conditions: Sputtering Voltage=492 volts; Vacuum System Pressure=$5.1\times10^{-3}$ torr; $O_2$/Ar Flow Ratio=0.07; Substrate Transport Speed=4.5 ft./min. The transmission and reflection spectra of the resultant coating on the PET substrate were measured from the substrate (PET) side using a Shimadzu MPC-3100 spectrophotometer with an integrating sphere. The transmission optical density (TOD=−logT, where T is the measured fractional transmission) and reflection optical density (ROD=−logR, where R is the measured fractional reflectance) at 380 nm and 1060 nm are listed in Table 1. The thickness of the black aluminum coating was determined by profilometry after masking and etching a portion of the coating with 20 percent by weight aqueous sodium hydroxide.

TABLE 2

| Data for Donor Element 2 (DE-2) | | |
|---|---|---|
| TOD of Light to Heat Conversion Layer, at 1064 nm, from Substrate Side | ROD of Light to Heat Conversion Layer, at 1064 nm, from Substrate Side | Thickness of Light to Heat Conversion Layer, (Angstroms) |
| 0.81 | 0.46 | 850 |

The $AlO_x$ coating was then overcoated using a #4 coating rod with an aqueous solution of 8.3 weight percent blue dichroic dye of formula VIII above. The coating was dried at 60° C. for two minutes to produce a laser absorbing donor with a dichroic dye coating, designated DE-2. The same dichroic dye solution was then coated and dried on a 75 mm×50 mm×1 mm glass slide under identical conditions, to produce a comparative sample designated CE-1.

Laser Induced Transfer of Dichroic Dye Donor Coating to Receptor Element

The dichroic dye coating of DE-2 was contacted to a 75 mm×50 mm×1 mm glass slide receptor element, and the polarizing mass transfer layer was transferred in an imagewise fashion using the laser imaging conditions described in Example 1. The laser power, spot size ($1/e^2$ diameter), and pulse width employed for these experiments were 8.0 watts, 100 μm and 8, 6, 4 and 2 μsec, respectively. The imaged receptor was designated IR-2.

Measurement of Dichroic Ratio of Transferred Coating of IR-2.

Figure 6:
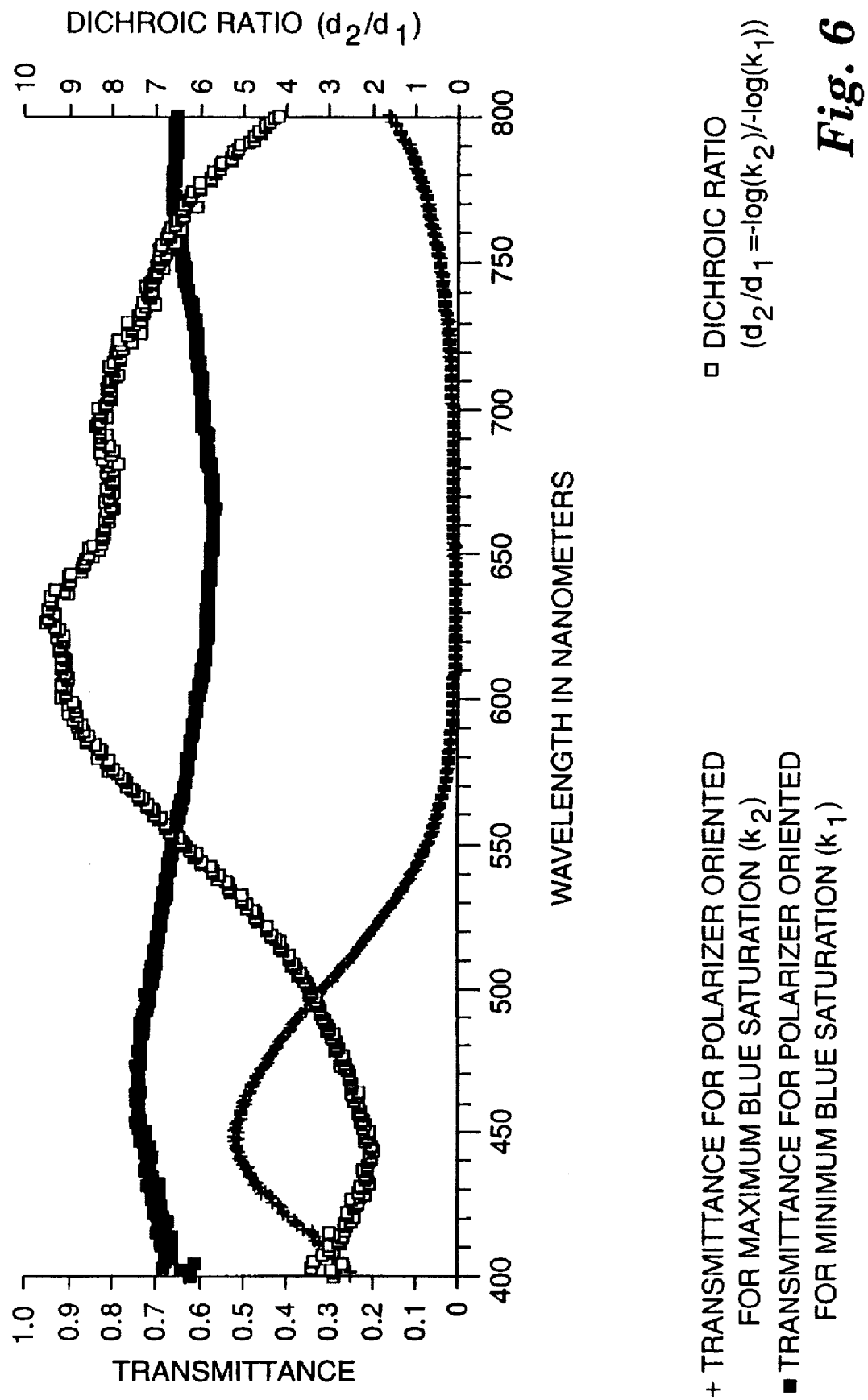
Figure 7:
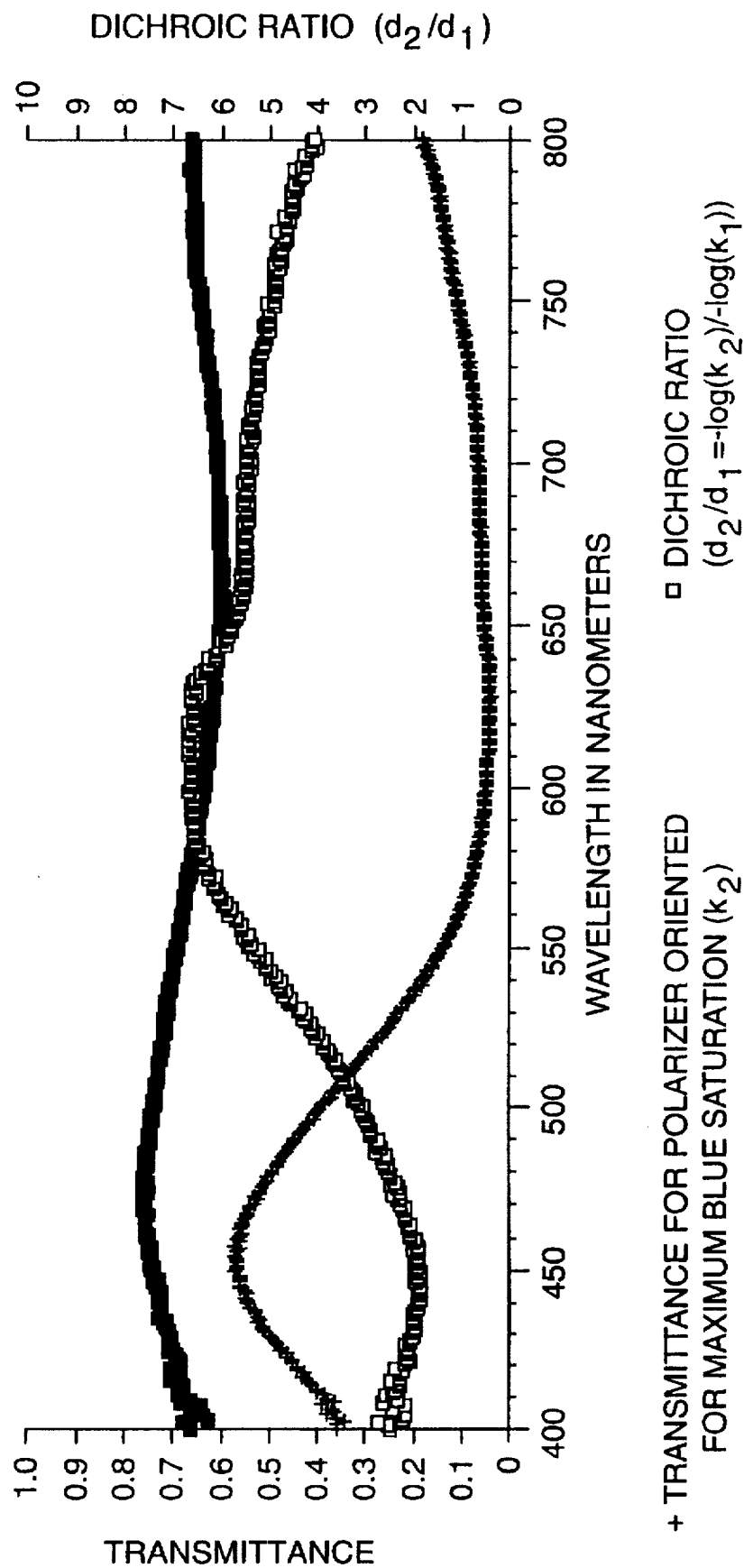

The dichroic ratios of the original coating of the CE-1, and the transferred coating of IR-2 were measured using the same procedures described in Example 1. The corresponding data for CE-1 and the transferred coating of IR-2 are provided in FIGS. 6 and 7, respectively. Again comparison of the corresponding dichroic ratios over the spectral range 400 to 800 nm demonstrates the successful imagewise transfer of the polarizing mass transfer layer from Donor Element 2 to Receptor Element 2, while maintaining the optically anisotropic character of the polarizing mass transfer layer.

Example 3

Resistive-Heated Thermal Mass Transfer of a Dichroic Polarizing Film to a Donor

Preparation of Polarizing Mass Transfer Donor Element 3 (DE-3)

The non-backside coating side (the PET surface) of a section of 4.5 μm Toyo Metallizing TTR-101 thermal transfer media substrate was coated using a #4 coating rod, with an 8 weight percent aqueous solution of blue dichroic dye of formula VIII above. After coating, the sample was dried in a forced air oven at 60° C. for two minutes. The polarizing mass transfer donor was designated DE-3.

Thermal Mass Transfer of Dichroic Dye Donor Coating to a Receptor

Donor Element DE-3 was spliced to a section of ribbon from a 3M Rainbow™ donor media cartridge, and the cartridge was placed into a 3M Rainbow™ Printer (Model 2710AFN, Field Revision 2). The polarizing mass transfer layer of DE-3 was then transferred, in the image of a test pattern, onto 3M "Transparency Film for Sublimation Color Printer (3M Part No. A-5TFC)" using the 3M Rainbow™ Printer. The imaged receptor was designated IR-3.

Measurement of Dichroic Ratio of Transferred Coating of IR-3

Figure 8:
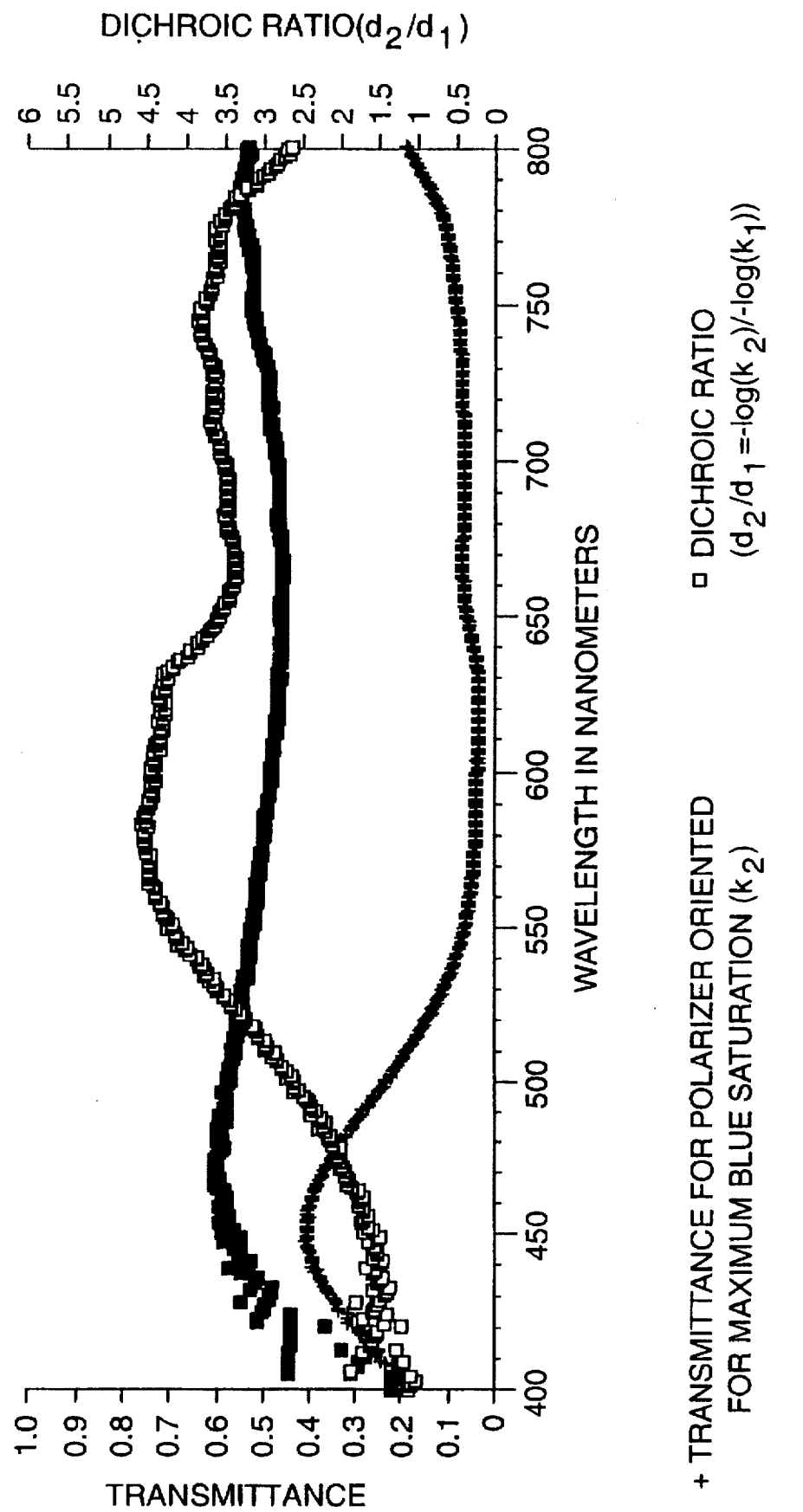
Figure 9:
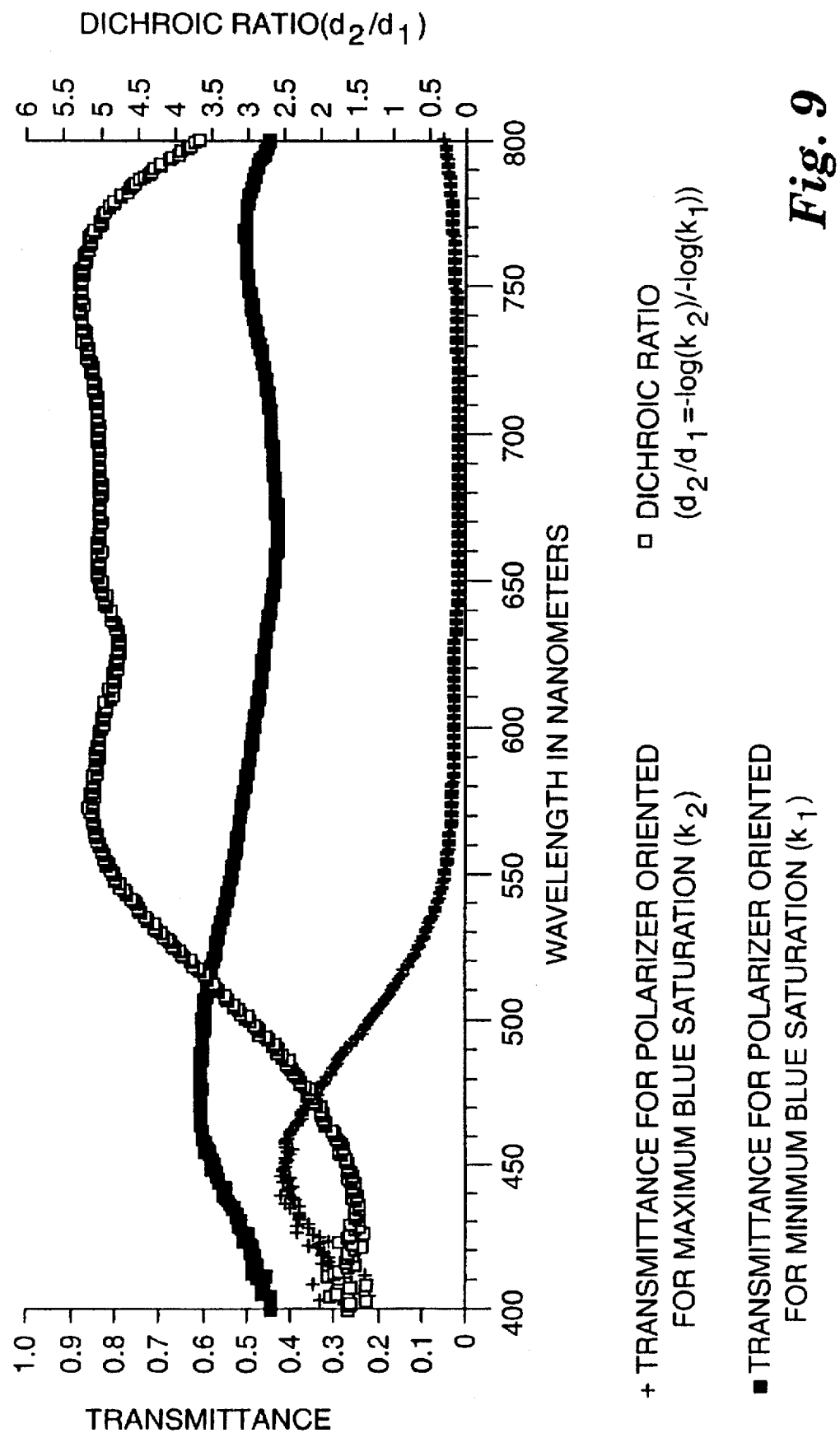

The dichroic ratios of the original coating of DE-3, and the transferred coating of IR-3, were measured using the same procedures described in Example 1. The corresponding data for DE-3 and the transferred coating of IR-3 are provided in FIGS. 8 and 9, respectively. Again, comparison of the corresponding dichroic ratios over the spectral range 400 to 800 nm demonstrates the successful resistive-heated, imagewise thermal mass transfer of the polarizing mass transfer layer from DE-3 to produce IR-3, while maintaining the optically anisotropic properties of the polarizing mass transfer layer.

Example 4

The dichroic dye coating of DE-1 of Example 1 was contacted to a 75 mm×50 mm×1 mm glass slide receptor element and the dichroic dye coating was transferred in an imagewise fashion from DE-1 to the glass slide receptor element using the following laser imaging conditions.

The polarizing mass transfer layer side of DE-1 was held in intimate contact with the glass receptor element, as the receptor element was held in a vacuum chuck. The laser was incident upon the substrate side of DE-1, and normal to the donor/receptor surface. The vacuum chuck was attached to an X-Y translation stage such that it could be scanned in the plane of the donor/receptor surface, allowing laser exposure over the entire surface. A modified Quantronix Q-switched, frequency-doubled Nd:YAG laser system was used for exposure, providing up to 1.5 millijoule, 60 nanosecond pulses at 532 nm. The laser had a Gaussian spatial profile with the spot size tailored using external optics. The laser energy and spot size ($1/e^2$ diameter) employed for this example were 1.2 millijoules and about 800 µm, respectively. The imaged receptor was designated IR-4.

Figure 10:
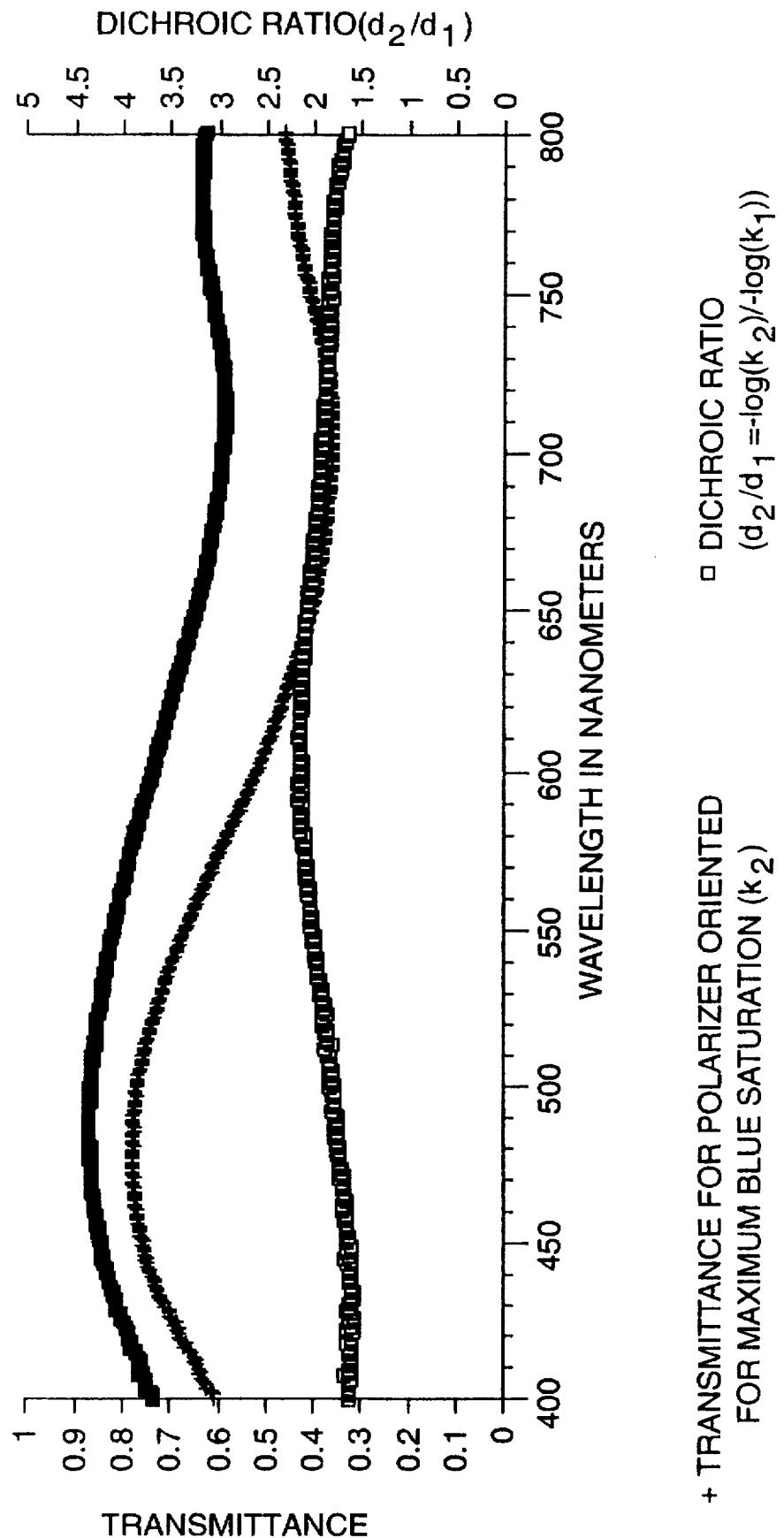

The dichroic ratios of IR-4 were measured using the same procedures as described in Example 1. The data for the transferred coating of IR-4 are provided in FIG. 10. Comparison of the corresponding dichroic ratios over the spectral range from 400 to 800 nm demonstrates the successful transfer of the polarizing mass transfer layer from DE-1 to a glass receptor element, with the imaged receptor element exhibiting optically anisotropic properties.

Example 5

An 8% by weight aqueous solution of blue dichroic dye having formula VIII above was coated onto a 4.5µ PET substrate using a #12 Meyer bar. After air drying, the coated substrate was oven dried at 80° C. for 1 minute to result in polarizing mass transfer donor element 5 (DE-5). The dry thickness of the polarizing mass transfer layer was ~1.5µ. The polarizing mass transfer layer of DE-5, when viewed under a regular plane polarizer, showed a prominent polarizing effect along the direction of the Meyer bar coating.

The polarizing mass transfer layer of DE-5 was transferred to a piece of Shoeller's EAA coated paper using Model II 200 dpi (dots per inch) thermal printer at an energy of >12 volts (~1.4 $J/cm^2$). Good and complete transfer was obtained of both solid and alphanumerical images. Resolution was >200 dpi, limited by the printer resolution. The thermally mass transferred polarizer image showed a prominent polarizing effect similar to the polarizing property of DE-5.

Example 6

Polarizing mass transfer donor element 6 (DE-6) was prepared similar to DE-5 of example 5 using the same 8% solution of blue dichroic dye. A transparent receptor element (RE-6), was prepared by coating a 10 wt % in toluene 7/3 VPE5833/Staybelite Ester 10, on a plain PET substrate, using a #18 Meyer bar and oven dried. The polarizing mass transfer layer of the mass transfer donor element 6 (DE-6), when viewed under a regular plane polarizer, showed a prominent polarizing effect along the direction of the Meyer bar coating.

The polarizing mass transfer layer was thermally mass transferred to the transparent receptor, at an energy of >14 volts (~1.9 $J/cm^2$), using Model II 200 dpi thermal printer. Good and complete transfer was obtained of both solid and the alphanumerical images. Resolution was >200 dpi, limited by the printer resolution. The thermally mass transferred polarizer dye image maintained the polarizing property of the donor element.

Example 7

A #6 Meyer bar was used to coat the 8% wt. blue dichroic dye solution described in Example 5, onto a 4.5µ PET substrate. After air and oven drying, an adhesive coating comprising a 7% solution of Wax Emulsion I was coated on top of the dye layer using a #18 Meyer bar.

Wax Emulsion I was a 10% solid wax-polymer emulsion in Toluene, prepared as follows: a clear, 5% solid solution of the wax-polymer with the ingredients Chlorowax 70/Shellwax 700/Acryloid B82/Carnauba wax/Synthetic Candelilla/Staybelite Ester 10/Elvax 210, 1.25/1.67/0.1/2.5/1.0/0.05/0.6, was prepared at a temperature of ~70° C. A small amount (2-5% to the solid content of the solution) of OLOA 1200 was added to the solution as a stabilizer. The solution was brought back to room temperature (under high-speed agitation) to obtain a stable emulsion. In order to improve adhesion between the dye layer and the wax layer, the emulsion (prepared at 10% solids in toluene) was further diluted using MEK to 7% wt. The double layer coating was then oven dried again at 80° C. for 1 minute to provide polarizing mass transfer donor element DE-7. The polarizing mass transfer layer of the mass transfer donor element 7 (DE-7), when viewed under a regular plane polarizer, showed a prominent polarizing effect along the direction of the Meyer bar coating.

The polarizing mass transfer layer of DE-7 was transferred to a thermal grade paper receptor element (SSP-A from Calcomp) using Model II 200 dpi thermal printer at an energy of >18 volts (~3.1 $J/cm^2$). Good and complete transfer was obtained of both solid and the alphanumerical images. Resolution was ≈200 dpi. The thermally mass transferred polarizing mass transfer layer maintained the polarizing property of the donor element.

Example 8

A #6 Meyer bar was used to coat the same 8% wt. blue dichroic dye aqueous solution as described in Example 5, onto a 4.5μ PET substrate. After air and oven drying, a 10 wt % in toluene adhesive coating (7/3, VPE5833/Staybelite Ester 10) was coated on top of the polarizing mass transfer layer using a #4 Meyer bar. The double layer coating was then oven dried again at 80° C. for 1 minute to produce polarizing mass transfer element 8 (DE-8). The polarizing mass transfer layer of DE-8, when viewed under a regular plane polarizer, showed a prominent polarizing effect along the direction of the Meyer bar coating.

The polarizing mass transfer layer of DE-8 was thermally mass transferred to a plain PET receptor element using Model II 200 dpi thermal printer, at an energy of >14 volts (~1.9 J/cm$^2$). Good and complete transfer was obtained of both and alphanumerical images. Resolution was >200 dpi, limited by the printer resolution. The thermally mass transferred polarizing mass transfer layer maintained the polarizing property of the donor element.

Example 9

Receptor Element 9 (RE-9) was prepared by coating a Dye Receptor Solution: PE222/Pantalyn C/KF393, 7/1/0.09, 10% wt. solution in MEK, onto a PVDC primed, 4 mil PET using a #10 Meyer bar.

The polarizing mass transfer layer of DE-7 was thermally mass transferred to RE-9 using a Model II 200 dpi thermal printer at an energy of >16 volts (~2.5 J/cm$^2$). Complete transfer was obtained of both solid and the alphanumerical images. Resolution was >200 dpi, limited by the printer resolution. However, the image appeared to tear and chatter when energy was set at >19 volts (~3.5 J/cm$^2$).

TABLE 3

MATERIALS AND VENDORS

| Material | Vendor |
| --- | --- |
| Acryloid B82 | Rohm & Haas (Philadelphia, PA) |
| Elvax 210 | E. I. DuPont (Wilmington, DE) |
| Staybelite Ester 10 and EHEC X-high (ethyl cellulose) | Hercules, Inc. (Wilmington, DE) |
| Chlorowax 70 | Diamond Shamrock (CL., OH) |
| Shellwax 700 | Shell Chem., Co. (Houston, TX) |
| Carnauba Wax | Frank B. Ross Co. (Jersey City, NJ) |
| Synthetic Candelilla Wax | Frank B. Ross Co. (Jersey City, NJ) |
| OLOA 1200 | Chevron Chem., Co. (Rolling Meadows, IL) |
| PE222 | Shell Chemical Co. (Houston TX) |
| Pantalyn C | Hercules Inc. (Wilmington DE) |
| KF-393 Silicone Fluid | Shin-Etsu Silicones of America, Inc. (Torrence CA) |
| VPE 5833 | Shell Chemical Inc. (Houston TX) |

What is claimed is:

1. A method of transferring a polarizing mass transfer layer from a polarizing mass transfer donor element to a receptor element, the method comprising the steps of:

a) providing a polarizing mass transfer donor element comprising:
   a substrate, and
   a polarizing mass transfer layer;

b) providing a receptor element in contact with the polarizing mass transfer layer of the donor element; and c) heating one or more of a portion of the polarizing mass transfer donor element, or a portion of the receptor element, to transfer a high-resolution image of polarizing mass transfer layer from the polarizing mass transfer donor element to the receptor element, to provide an optically anisotropic transferred image.

2. The method of claim 1, wherein the method transfers an image that has a resolution of at least 50 dots per inch.

3. The method of claim 1, wherein the method transfers an image that has a resolution of at least 200 dots per inch.

4. The method of claim 1, wherein the polarizing mass transfer layer comprises a polarizer molecule having the formula {Chromagen}(SO$_3$M)$_n$, wherein M is a monovalent cation.

5. The method of claim 4, wherein the polarizer molecule has the formula:

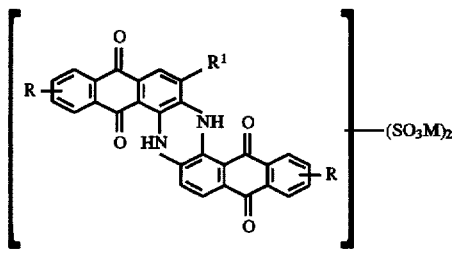

wherein:

each R is independently chosen from the group consisting of: H, Alk, ArNH, or ArCONH;

R$^1$=H, Cl;

Alk is an alkyl group;

Ar is a substituted or unsubstituted aryl radical; and

M is a monovalent cation.

6. The method of claim 1, wherein the polarizing mass transfer layer further comprises a binder.

7. The method of claim 1, wherein the portion of the polarizing mass transfer donor element or the portion of the receptor element is heated using a thermal print head.

8. The method of claim 1, wherein the portion of polarizing mass transfer donor element or the portion of the receptor element is heated optically.

9. The method of claim 8, wherein the portion of the polarizing mass transfer donor element or the portion of the receptor element is heated using a laser.

10. The method of claim 9, wherein the laser emits electromagnetic radiation at a wavelength in the visible, ultraviolet, or infrared spectral region.

11. The method of claim 10, wherein the laser emits electromagnetic radiation of a wavelength in the range from about 0.5 to 1.2 microns.

12. The method of claim 1, wherein the polarizing mass transfer donor element comprises a light absorbing material.

13. The method of claim 12, wherein the light absorbing material is present in the substrate of the polarizing mass transfer donor element.

14. The method of claim 12, wherein the light absorbing material is present in the polarizing mass transfer layer.

15. The method of claim 12, wherein the light absorbing material comprises polarizer molecules.

16. The method of claim 1, wherein the polarizing mass transfer donor element further comprises a light to heat conversion layer provided between the substrate and the polarizing mass transfer layer.

17. The method of claim 16, wherein the light to heat conversion layer is comprised of materials chosen from the group consisting of: carbon black, metal oxides and sulfides of Al, Bi, Sn, In, Zn, Ti, Cr, Mo, W, Co, Ir, Ni, Pd, Pt, Cu, Ag, Au, Zr, and Te, and mixtures thereof.

18. The method of claim 17, wherein the light to heat conversion layer contains carbon black.

19. The method of claim 1, wherein the polarizing mass transfer donor element further comprises an adhesive layer disposed on top of the polarizing mass transfer layer.

20. The method of claim 1, wherein the receptor element comprises a substrate and a light absorbing material.

21. The method of claim 20, wherein the light absorbing material is present in the substrate of the receptor element.

22. The method of claim 20, wherein the light absorbing material is present as a separate layer of the receptor element.

23. The method of claim 1, wherein the receptor element comprises a substrate and an adhesive layer.

24. A polarizing mass transfer donor element comprising:
a substrate;
a polarizing mass transfer layer comprising a polarizer molecule dispersed in a binder; and
a light to heat conversion layer.

25. The polarizing mass transfer donor element of claim 24, wherein the polarizer molecule has the formula {Chromagen}$(SO_3M)_n$, wherein M is a monovalent cation.

26. The polarizing mass transfer donor element of claim 25, wherein the polarizer molecule has the formulas:

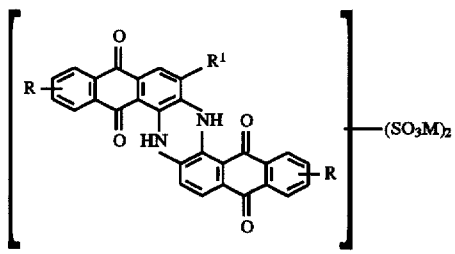

wherein:

each R is independently chosen from the group consisting of: H, Alk, ArNH, or ArCONH;

$R^1$=H, Cl;

Alk is an alkyl group;

Ar is a substituted or unsubstituted aryl radical; and

M is a monovalent cation.

27. The polarizing mass transfer donor element of claim 24, wherein the light to heat conversion layer is comprised of materials chosen from the group consisting of: carbon black, metal oxides and sulfides of Al, Bi, Sn, In, Zn, Ti, Cr, Mo, W, Co, Ir, Ni, Pd, Pt, Cu, Ag, Au, Zr, and Te, and mixtures thereof.

28. The polarizing mass transfer donor element of claim 27, wherein the light to heat conversion layer comprises carbon black.

29. The polarizing mass transfer donor element of claim 24, wherein the polarizing mass transfer donor element further comprises an adhesive layer disposed on top of the polarizing mass transfer layer.

* * * * *